US005524999A

United States Patent [19]

Morbitzer

[11] Patent Number: 5,524,999

[45] Date of Patent: Jun. 11, 1996

[54] MULTIPLE THERMOSTAT ASSEMBLY

[75] Inventor: Hans-Peter Morbitzer, Langenlebarn, Austria

[73] Assignee: Electrovac, Fabrikation Elektronischer Spezialartikel Gesellschaft mbH., Klosterneuburg, Austria

[21] Appl. No.: 350,222

[22] Filed: Dec. 5, 1994

[30] Foreign Application Priority Data

Dec. 3, 1993 [AT] Austria .................................... 2454/93

[51] Int. Cl.[6] ................................ B25G 3/28; G01K 5/00

[52] U.S. Cl. ............................ 403/27; 403/278; 403/286; 374/187; 374/208

[58] Field of Search ..................................... 403/274, 278, 403/279, 281, 282, 280, 213, 325, 270, 110, 194, 196, 204, 208, 209, 210; 248/300, 548, 900; 374/196, 204, 198, 208, 210

[56] References Cited

U.S. PATENT DOCUMENTS 4,074,943 2/1978 Szugda .................................... 403/174
4,696,579 9/1987 DeFilippis et al. ...................... 374/187
5,284,289 2/1994 Killian ................................ 403/272 X

FOREIGN PATENT DOCUMENTS 2440186 3/1976 Germany ............................... 374/187
3727313 3/1989 Germany ............................... 374/208

*Primary Examiner*—Kenneth J. Dorner
*Assistant Examiner*—Bruce A. Lev
*Attorney, Agent, or Firm*—Henry M. Feiereisen

[57] ABSTRACT

A multiple thermostat assembly includes a plurality of thermostats which are grouped together to form a structural unit, with each thermostat including a base plate. The base plates of neighboring thermostats are joined together by plastically deformable adjusting elements in form of U-shaped mountings, webs or pins for allowing a positional adjustment between neighboring base plates relative to each other.

6 Claims, 2 Drawing Sheets

MULTIPLE THERMOSTAT ASSEMBLY

BACKGROUND OF THE INVENTION

The present invention refers to a multiple thermostat assembly with a plurality of thermostats grouped together to form a structural unit, with each thermostat including a base plate.

German publication DE-OS 24 401 86 describes such an assembly in which the individual thermostats are secured together via a pot-shaped mounting on a common flange plate. This flange plate can either be connected to a container wall, the temperature of which being monitored, or directly protrude through the container wall into the fluid being monitored. A drawback of such an assembly is the relative complicated design of the mounting for the thermostats upon the flange plate. Moreover, since the common single flange plate extends over the entire assembly, the mounting is relatively stiff and may prevent an intimate fit of the flange plate upon the component whose temperature is to be monitored so that an even heat transfer is not ensured for all thermostats.

SUMMARY OF THE INVENTION

It is an object of the present invention to provide an improved multiple thermostat assembly obviating the aforestated drawbacks.

In particular, it is an object of the present invention to provide an improved multiple thermostat assembly which allows each single thermostat to be in close contact upon the component being monitored, and yet is still of simple configuration.

These objects and others which will become apparent hereinafter are attained in accordance with the present invention by joining together the base plates of the individual thermostats through plastically deformable adjusting elements by which the relative position between neighboring base plates can be adjusted through deformation such as bending, twisting or the like.

In this manner, the assembly block of thermostats can be best suited to the respective surface to accomplish a reliable thermal contact.

Preferably, the adjusting elements are U-shaped mountings of any plastically deformable material which are secured to the base plates of neighboring thermostats, preferably by laser spot welding. Further examples for elements include webs, pins or strips of suitable flexible material for connecting neighboring base plates.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1:
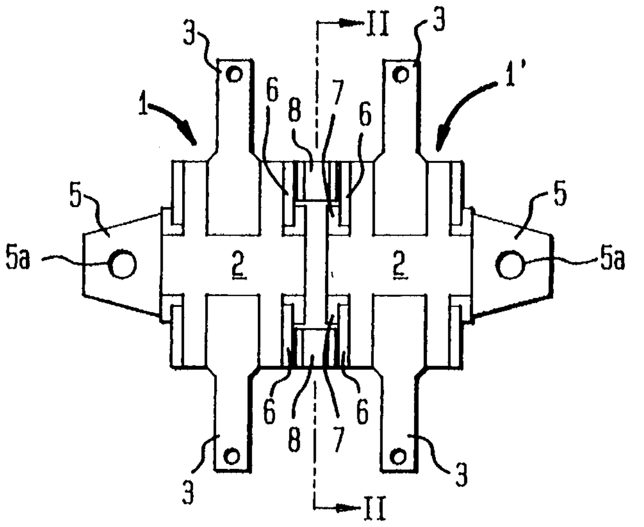
FIG. 1 is a top view of one embodiment of a multiple thermostat assembly according to the present invention.

Throughout all the Figures, the same or corresponding elements are always indicated by the same reference numerals.

Turning now to the drawing, and in particular to FIG. 1, there is shown a top view of one embodiment of a multiple thermostat assembly block according to the present invention. In the nonlimiting example of FIG. 1, the assembly block includes two thermostats, generally designated by reference numeral 1, 1'. It will be understood that the two thermostats 1,1' are shown by way of example only and that the assembly may certainly include more than two such thermostats.

Each thermostat 1, 1' includes a base plate 4 and an insulating body 2 which is set on the base plate 4 and carries electric terminals 3 for a not shown contact system accommodated within the insulating body 2 and actuated by a bimetallic strip (not shown). The base plate 4 is preferably made of steel with an aluminum coating. The operation of thermostats is generally known and does not form part of the present invention so that a further description thereof has been omitted.

Figure 2:
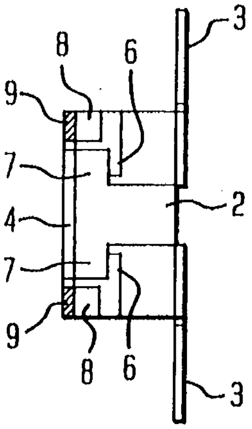
FIG. 2 is a sectional view of the multiple thermostat assembly taken along the line II—II of FIG. 1.
Figure 4:
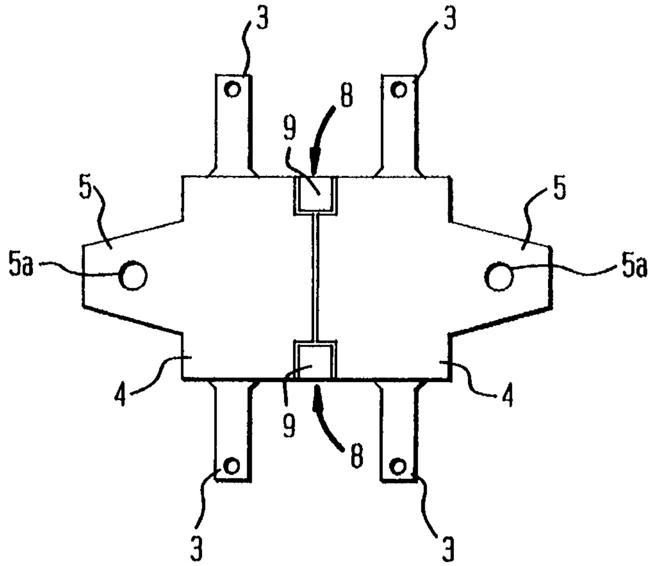
FIG. 4 is a bottom view of the multiple thermostat assembly of FIG. 1.

As best seen in FIG. 4, which shows a bottom view of the multiple thermostat assembly, the base plate 4 of each thermostat 1, 1' is provided on one side with a truncated prolongation 5 for attachment to a heat contact surface of a component to monitor the temperature, via e.g. a bolt (not shown) received in a bore 5*a*. At the other side, distant to the prolongation 5, the base plate 4 is bent upwards to form a lug 6 which is folded about a projection 7 of the insulating body 2, as best seen in FIG. 2.

Figure 3A:
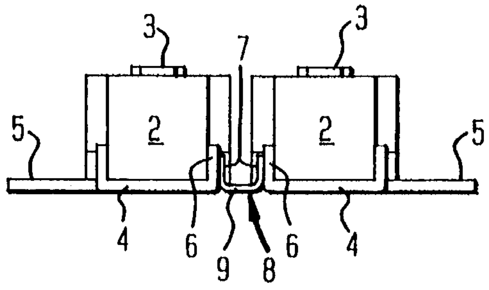
FIG. 3*a* is a front view of the multiple thermostat assembly of FIG. 1.

As shown in particular in FIG. 3*a*, which is a front view of the multiple thermostat assembly, the facing sides of neighboring thermostats 1, 1' are devoid of prolongations 5 and the opposing lugs 6 are joined together by a flexible or plastically deformable adjusting element in form of a U-shaped mounting or bracket 8. Suitably, the bracket 8 is made of metal, preferably of a same material as the base plates 4 of the thermostats 1, 1' i.e. steel with an aluminum coating. Further examples include copper, nickel-plated steel, pure nickel or the like. Suitably, the bracket 8 is configured in such a manner that the shorter shank or base 9 is substantially flush with the outer surface of the base plates 4. The connection of the brackets 8 to the base plates 4 and the lugs 6 is carried out preferably by laser spot welding. Other methods such as soldering are certainly also possible.

Figure 3B:
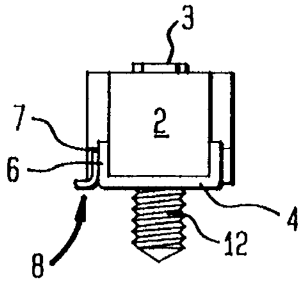
FIG. 3*b* is a fragmentary front view of a modified thermostat assembly.

FIG. 3*b* is a fragmentary front view of a modified thermostat assembly in which the prolongation 5 is substituted by a threaded bolt 12 which projects downwards from the base plate 4 of each thermostat 1, 1' for attachment to the contact surface of a component being monitored.

As stated above, the assembly block may include a random number of thermostats, whereby all those thermostats which are arranged in succession between the terminal thermostats at the end of the assembly are without a prolongation 5 and include a threaded bolt 12 as shown in FIG. 3*b*.

It will be appreciated by persons skilled in the art that the U-shaped brackets 8 are shown by way of example only and may be substituted by other adjusting elements to allow a positional adjustment between neighboring thermostats relative to each other. Further examples for adjusting elements include pins, webs or bands, which also need not necessarily be secured to the lugs 6.

Figure 5:
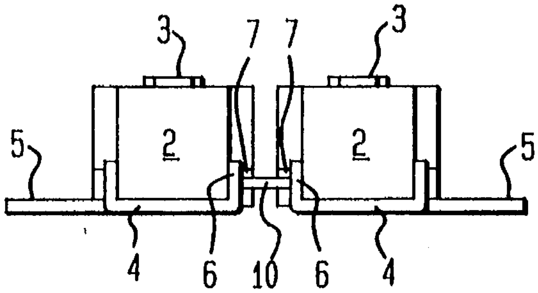
FIG. 5 is a front view of another embodiment of a multiple thermostat assembly according to the present invention.
Figure 6:
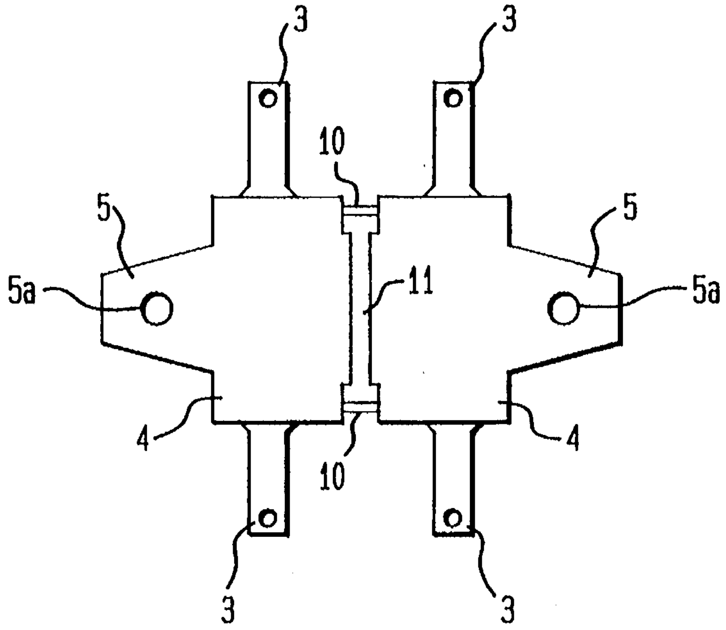
FIG. 6 is a bottom view of the multiple thermostat assembly of FIG. 5.

FIGS. 5 and 6 show front and bottom views of such an alternative embodiment of a multiple thermostat assembly according to the present invention in which pin-like adjusting elements 10 directly join together the base plates 4 of neighboring thermostats 1, 1' in the area of the lugs 6 and/or at 11.

Persons skilled in the art will understand that a same multiple thermostat assembly may also include different types of adjusting elements.

Figure 7:
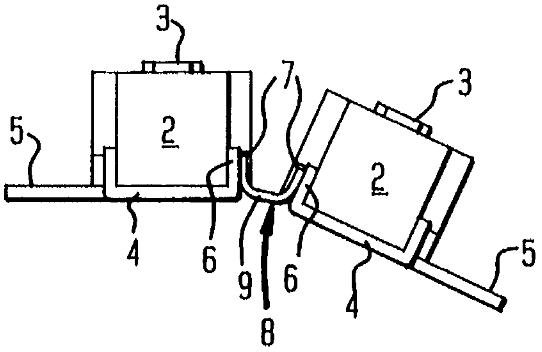
FIG. 7 is a front view of the multiple thermostat assembly of FIG. 1, showing an example of a modified positional arrangement of neighboring thermostats.

Turning now to FIG. 7, there is shown a front view of the multiple thermostat assembly of FIG. 1, showing an example of a modified positional arrangement of neighboring thermostats 1, 1' By suitably bending or twisting the adjusting element 8, the assembly can be angled and thus best suited to uneven contact surfaces or stepped surfaces of the component being monitored to attain a close and intimate fit of the base plates 4 of the thermostats upon the contact surface. Thus, as shown in FIG. 7, the same assembly can be used upon inclined surfaces or upon surfaces which extend perpendicular to each other.

While the invention has been illustrated and described as embodied in a multiple thermostat assembly, it is not intended to be limited to the details shown since various modifications and structural changes may be made without departing in any way from the spirit of the present invention.

What is claimed as new and desired to be protected by Letters Patent is set forth in the appended claims:

I claim:

1. A multiple thermostat assembly; comprising:

a plurality of thermostats grouped together to form a structural unit, each thermostat including a base plate; and plastically deformable adjusting means joining together base plates of neighboring thermostats for allowing a positional adjustment between neighboring base plates relative to each other.

2. The assembly of claim 1 wherein said adjusting means includes a bracket.

3. The assembly of claim 2 wherein said bracket is U-shaped.

4. The assembly of claim 1 wherein said adjusting means includes a pin.

5. The assembly of claim 1 wherein said adjusting means includes a web.

6. The assembly of claim 1 wherein said adjusting means are secured to said base plates via laser spot welding.

* * * * *